US011599036B2

(12) United States Patent
Inoue et al.

(10) Patent No.: US 11,599,036 B2
(45) Date of Patent: *Mar. 7, 2023

(54) TONER (71) Applicant: CANON KABUSHIKI KAISHA, Tokyo (JP)

(72) Inventors: Koki Inoue, Numazu (JP); Yoshihiro Nakagawa, Numazu (JP); Junya Asaoka, Mishima (JP); Yuu Sasano, Susono (JP); Yuhei Terui, Numazu (JP); Kenta Katayama, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,241

(22) Filed: Aug. 11, 2020

(65) Prior Publication Data
US 2021/0063902 A1 Mar. 4, 2021

(30) Foreign Application Priority Data
Aug. 29, 2019 (JP) .............................. JP2019-156503

(51) Int. Cl.
G03G 9/087 (2006.01)
G03G 9/08 (2006.01)
(Continued)

(52) U.S. Cl.
CPC .......... G03G 9/08711 (2013.01); C08L 83/04 (2013.01); G03G 9/0821 (2013.01);
(Continued)

(58) Field of Classification Search
CPC ............. G03G 9/08773; G03G 9/0825; G03G 9/0827; G03G 9/09725; G03G 9/0821;
(Continued)

(56) References Cited

U.S. PATENT DOCUMENTS 4,837,105 A * 6/1989 Manca ............... G03G 9/08773
430/108.3
6,569,589 B2 5/2003 Inaba et al.
(Continued)

FOREIGN PATENT DOCUMENTS

EP 1197804 A1 4/2002
EP 1836536 B1 * 2/2013 ......... G03G 9/08791
(Continued)

OTHER PUBLICATIONS

"Machine Translation of JP 2007148373 A, published Jun. 2007 to Takeda et al." (Year: 2007).*
(Continued)

Primary Examiner — Peter L Vajda
Assistant Examiner — Boone Alexander Evans
(74) Attorney, Agent, or Firm — Venable LLP

(57) ABSTRACT

A toner comprising a toner particle that contains a binder resin and a wax, wherein the toner particle contains an organosilicon polymer as given by formula (1) below;

$$R^1\text{—}SiO_{3/2} \quad (1),$$

in formula (1), $R^1$ is an alkyl group having from 1 to 4 carbons; in a cross section of the toner particle observed using a transmission electron microscope, in terms of a distance A from the centroid of the cross section of the toner particle to a contour of the cross section, the organosilicon polymer is present in a region that is not more than 80% of the distance A from the centroid; and an absolute value of a difference between an SP value of the organosilicon polymer and an SP value of the wax is not more than 0.70 $(\text{cal}/\text{cm}^3)^{1/2}$.

9 Claims, 1 Drawing Sheet (51) Int. Cl.
*C08L 83/04* (2006.01)
*G03G 9/097* (2006.01)

(52) U.S. Cl.
CPC ....... *G03G 9/0825* (2013.01); *G03G 9/08773* (2013.01); *G03G 9/08782* (2013.01); *G03G 9/097* (2013.01)

(58) Field of Classification Search
CPC ........... G03G 9/08706; G03G 9/09342; G03G 9/09328
See application file for complete search history.

(56) References Cited

U.S. PATENT DOCUMENTS

| | | | |
|---|---|---|---|
| 8,158,320 B2* | 4/2012 | Kim | G03G 9/09371 430/108.1 |
| 8,440,382 B2 | 5/2013 | Isono et al. | |
| 8,497,054 B2 | 7/2013 | Sugiyama et al. | |
| 8,603,712 B2 | 12/2013 | Aoki et al. | |
| 8,652,725 B2 | 2/2014 | Watanabe et al. | |
| 8,652,737 B2 | 2/2014 | Handa et al. | |
| 8,741,519 B2 | 6/2014 | Watanabe et al. | |
| 8,778,581 B2 | 7/2014 | Nonaka et al. | |
| 8,846,284 B2 | 9/2014 | Kinumatsu et al. | |
| 8,916,319 B2 | 12/2014 | Ikeda et al. | |
| 8,940,467 B2 | 1/2015 | Hashimoto et al. | |
| 9,170,509 B2 | 10/2015 | Masuda | |
| 9,229,345 B2 | 1/2016 | Ikeda et al. | |
| 9,341,967 B2 | 5/2016 | Tsujino et al. | |
| 9,366,981 B2 | 6/2016 | Yamawaki et al. | |
| 9,429,860 B2 | 8/2016 | Kinumatsu et al. | |
| 9,500,972 B2 | 11/2016 | Tanaka et al. | |
| 9,551,947 B2 | 1/2017 | Hiroko et al. | |
| 9,575,424 B2 | 2/2017 | Nakagawa et al. | |
| 9,632,441 B2 | 4/2017 | Abe et al. | |
| 9,658,549 B2 | 5/2017 | Tanaka et al. | |
| 9,658,551 B2 | 5/2017 | Terui et al. | |
| 9,785,071 B2 | 10/2017 | Shimano et al. | |
| 9,785,077 B2 | 10/2017 | Abe et al. | |
| 9,829,814 B2 | 11/2017 | Yoshida et al. | |
| 9,829,816 B2 | 11/2017 | Tanaka et al. | |
| 9,835,964 B2 | 12/2017 | Yoshida et al. | |
| 9,857,711 B2 | 1/2018 | Yoshida et al. | |
| 9,904,193 B2 | 2/2018 | Nakagawa et al. | |
| 9,958,801 B2 | 5/2018 | Tanaka et al. | |
| 9,964,879 B2 | 5/2018 | Terui et al. | |
| 10,012,922 B2 | 7/2018 | Yoshida et al. | |
| 10,078,279 B2 | 9/2018 | Nakagawa et al. | |
| 10,078,285 B2 | 9/2018 | Kubo et al. | |
| 10,101,681 B2 | 10/2018 | Tagawa et al. | |
| 10,295,922 B2 | 5/2019 | Terui et al. | |
| 10,416,582 B2 | 9/2019 | Nakagawa et al. | |
| 10,437,165 B2 | 10/2019 | Shimano et al. | |
| 10,678,155 B2 | 6/2020 | Terui et al. | |
| 10,747,133 B2 | 8/2020 | Yagi et al. | |
| 2010/0159375 A1* | 6/2010 | Zhou | G03G 9/08711 430/137.14 |
| 2013/0236825 A1* | 9/2013 | Sweeney | G03G 9/0821 430/108.11 |
| 2013/0280650 A1* | 10/2013 | Sugama | G03G 9/08795 430/109.3 |
| 2014/0186760 A1* | 7/2014 | Kawaguchi | G03G 9/08773 430/108.3 |
| 2015/0378274 A1 | 12/2015 | Abe | |
| 2016/0378003 A1 | 12/2016 | Arimura | |
| 2017/0329246 A1* | 11/2017 | Yamawaki | G03G 9/09307 |
| 2018/0031991 A1* | 2/2018 | Yamashita | G03G 9/0819 |
| 2018/0329327 A1 | 11/2018 | Yamawaki | |
| 2019/0235402 A1 | 8/2019 | Inoue et al. | |
| 2020/0041922 A1 | 2/2020 | Shimano et al. | |

FOREIGN PATENT DOCUMENTS

| | | | | |
|---|---|---|---|---|
| EP | 2860585 A1 | | 4/2015 | |
| JP | 2002338689 A | * | 11/2002 | ......... G03G 9/08773 |
| JP | 2007133267 A | * | 5/2007 | ........... G03G 9/0806 |
| JP | 2007148373 A | * | 6/2007 | |
| JP | 2007-334118 | | 12/2007 | |
| JP | 2009-042386 | | 2/2009 | |
| JP | 2012-078628 | | 4/2012 | |
| WO | 2013/047296 | | 4/2013 | |

OTHER PUBLICATIONS

"Machine Translation of JP 2007133267 A, published May 2007 to Uchinokura et al." (Year: 2007).*
"Machine Translation of the description of publication # JP 2002338689 A" (Year: 2002).*
"Machine Translation of the description of publication # JP 2007148373 A" (Year: 2007).*
Fedors, "A Method for Estimating Both the Solubility Parameters and Molar Volumes of Liquids", Polymer Engineering And Science, vol. 14, No. 2 (1974) 147-54.
Harazaki, Tables 3-9 of "Basic Coating Science" (1986) 54 to 57 (Maki Shoten) (partial translation).
U.S. Appl. No. 16/989,991, Yuhei Terui, filed Aug. 11, 2020.

* cited by examiner

TONER

BACKGROUND OF THE INVENTION

Field of the Invention

The present invention relates to the toner for visualization of the electrostatic image in image-forming methods such as electrophotography, electrostatic printing, and magnetic recording.

Description of the Related Art

In recent years energy saving has been considered a major technical issue for copiers, printers and fax machines, and large-scale reductions in the amount of heat used by the image fixing apparatus are desired. Thus, there is increasing demand for toners with so-called "low temperature fixability", which allows images to be fixed with less energy.

In a general method for improving the low-temperature fixability of toners, the glass transition temperature (Tg) of the binder resin used is lowered with the goal of softening the binder resin. However, the following, for example, occur when simply only a reduction in the Tg of the binder resin is brought about: production of offset at the fixing member due to an inadequate release performance during fixing, and a reduction in the heat resistance during toner storage.

The addition of a plasticizer is a method for bringing about a satisfactory softening of the toner during fixing without causing a reduction in the Tg. WO 2013/047296 discloses a method for lowering the toner viscosity during fixing through the use of a softener that exhibits an excellent plasticizing performance. However, a plasticizer having a strong plasticizing capacity for the binder resin must be used in order to achieve a satisfactory softening of the toner during fixing. When such a plasticizer is used, exudation of the plasticizer onto the toner particle surface readily occurs during storage and image defects are then produced due to blocking and an impaired flowability.

To respond to the aforementioned demand, in accordance with Japanese Patent Application Laid-open No. 2007-334118 silica fine particles are internally incorporated in the toner and a wax having a low affinity for the binder resin is then adsorbed to silica aggregates and is uniformly dispersed in the binder resin: wax exudation onto the toner base particle surface is inhibited as a consequence. As a result, the flowability of the toner base particle is enhanced and adhesion and accumulation within the production apparatus is prevented.

In addition, to deal with the problem of the reduction in toner strength associated with an enhanced low-temperature fixability, Japanese Patent Application Laid-open No. 2009-42386 proposes, with regard to member contamination when a low-melting-point crystalline resin is used, that the strength be increased through the internal incorporation of a pearl necklace-type silica. By doing this, low-temperature fixing can be made to co-exist with prevention of the member contamination associated with a reduced toner strength.

To respond to the impaired storage stability in high-temperature environments and reduced development durability caused by plasticization of toner using an ester wax, according to Japanese Patent Application Laid-open No. 2012-078628 toner is produced in an aqueous medium with the co-use of a polar vinyl resin. By doing this, a core-shell structure can be established in which the ester wax, binder resin, and polar vinyl resin are present from the inner layer of the toner to the surface layer of the toner and the ester wax and binder resin are partially compatibilized.

The presence of ester wax compatibilized with the binder resin in the vicinity of the toner surface layer can be suppressed through the presence, in the vicinity of the toner surface layer and along a concentration gradient, of a more highly polar carboxyl group-bearing polar vinyl resin. Plasticization in the vicinity of the toner surface layer is made more difficult as consequence. The reduction in development durability and storage stability can be suppressed as a result.

SUMMARY OF THE INVENTION

As with the toner described in WO 2013/047296, a softener that exhibits an excellent plasticizing performance readily migrates to the toner particle surface and exposure of the plasticizer at the toner particle surface occurs during storage, and, for example, a reduction in image density due to a reduced flowability is then produced.

As with the toner described in Japanese Patent Application Laid-open No. 2007-334118, a problem still exists to some degree with regard to establishing co-existence between low-temperature fixing and the heat-resistant storability in the case of just the internal incorporation of silica fine particles in a toner. This occurs because the high hydrophilicity of the silica impedes the adsorption of the highly hydrophobic wax.

As with the toner described in Japanese Patent Application Laid-open No. 2009-42386, the internal incorporation of a pearl necklace-type silica alone does improve the filming through an improvement in the strength of the toner as a whole. However, this is unsatisfactory with regard to improving the heat-resistant storability because the wax, which migrates in the binder and eventually outmigrates to the surface, is unable to remain in the toner interior.

As with the toner described in Japanese Patent Application Laid-open No. 2012-078628, coating the toner surface layer with a polar resin does improves the heat-resistant storability; however, an unfavorable tendency is established for the release performance from the media due to wax exudation during fixing. In addition, there are limitations on the design of the surface layer and a trend is established toward a lower degree of freedom in toner design, in contrast to the diversification of unit design for laser beam printers.

The present invention provides a toner that solves the problems described above.

That is, the present invention provides a toner that, even in the case of use of a wax that has an excellent plasticizing performance for the binder resin, exhibits co-existence between the low-temperature fixability and heat-resistant storability and be free of image impairments, e.g., the reduction in image density due to member contamination caused by wax exudation to the toner particle surface.

A toner comprising a toner particle that contains a binder resin and a wax, wherein
the toner particle contains an organosilicon polymer as given by formula (1) below;

$$R^1\text{—}SiO_{3/2} \qquad (1),$$

in formula (1), $R^1$ is an alkyl group having from 1 to 4 carbons;

in a cross section of the toner particle observed using a transmission electron microscope, in terms of a distance A from the centroid of the cross section of the toner particle to a contour of the cross section, the organosilicon polymer is present in a region that is not more than 80% of the distance A from the centroid; and an absolute value of a difference between an SP value of the organosilicon polymer and an SP value of the wax is not more than 0.70 $(cal/cm^3)^{1/2}$.

The present invention provides a toner that, even in the case of use of a wax that has an excellent plasticizing performance for the binder resin, exhibits co-existence between the low-temperature fixability and heat-resistant storability and be free of image impairments, e.g., the reduction in image density due to member contamination caused by wax exudation to the toner particle surface.

Further features of the present invention will become apparent from the following description of exemplary embodiments with reference to the attached drawings.

DESCRIPTION OF THE EMBODIMENTS

Figure 1:
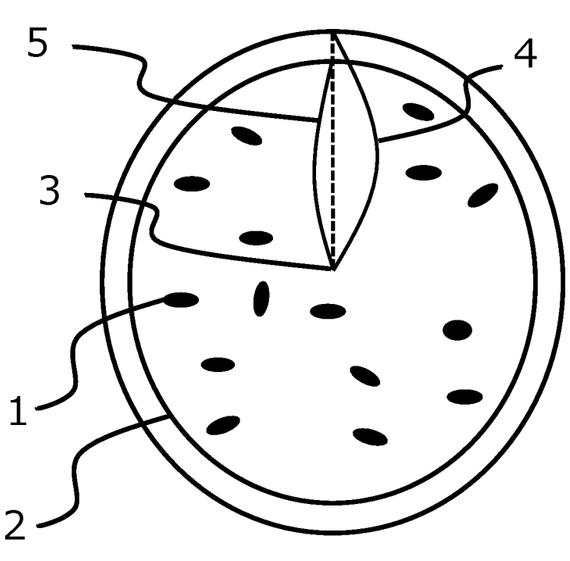
The FIGURE is a schematic diagram that illustrates the state of occurrence of organosilicon polymer in a toner particle.

The present invention is described in detail in the following.

Unless otherwise specified, descriptions of numerical ranges such as "from XX to YY" or "XX to YY" include the numbers at the lower and upper limits of the range.

In the following, when numerical ranges are described in stages, the upper and lower limits of each numerical range can be combined arbitrarily.

A toner according to the present invention is a toner containing a toner particle that includes a binder resin and a wax, wherein the toner particle contains an organosilicon polymer represented by formula (1).

Moreover, in a cross section of the toner particle observed using a transmission electron microscope, in terms of a distance A from the centroid of the cross section of the toner particle to a contour of the cross section, the organosilicon polymer is present in a region that is not more than 80% of the distance A from the centroid; also, an absolute value of a difference between an SP value of the organosilicon polymer and an SP value of the wax is not more than 0.70 $(cal/cm^3)^{1/2}$.

In order to achieve low-temperature fixability, the use is preferred of a wax that exhibits a good compatibility with, and an excellent plasticization activity for, the binder resin, for example, an ester wax. Such a wax, on the other hand, readily causes a reduction in the heat-resistant storability of toner in high-temperature, high-humidity ambients.

However, countering this by constructing a strong shell structure and/or raising the Tg of the binder resin tends to interfere with low-temperature fixing. That is, it is thought that the aforementioned heat-resistant storability and low-temperature fixability reside in a reciprocally complementary relationship. Due to this, it has been difficult to cause them to co-exist using the conventional art.

In order to provide a solution to the preceding, the present inventors focused on the internal incorporation in the toner of an organosilicon polymer acting as a filler. Specifically, intensive investigations were carried out with a focus on the relationship between the solubility parameters (SP values) of the wax and organosilicon polymer. As a result, it was discovered that the heat-resistant storability of toner could be substantially improved while maintaining the low-temperature fixability, by having the absolute value of the difference between the solubility parameters of the wax and organosilicon polymer be equal to or less than a certain value and by controlling the location of occurrence of the organosilicon polymer.

That is, by satisfying these conditions, co-existence between the low-temperature fixability and heat-resistant storability can be established and image defects such as, for example, the reduction in image density due to member contamination caused by wax exudation to the toner particle surface, can be suppressed.

The solubility parameter (SP value) is a parameter that indicates that two substances are more compatible if their SP values are similar. The SP value can be calculated by the commonly used Fedors method (Poly. Eng. Sci., 14(2), 147 (1974)) from the types and molar ratios of the component monomers.

The SP value is given in units of $(cal/cm^3)^{1/2}$ but can also be converted to units of $(J/m^3)^{1/2}$ using the formula 1 $(cal/cm^3)^{1/2}=2.046\times10^3 (J/m^3)^{1/2}$.

The present inventors think the following with regard to the reasons that the aforementioned effects are yielded by providing a toner that satisfies the aforementioned conditions.

Characteristic features are that the organosilicon polymer is internally incorporated in the toner particle and that the organosilicon polymer internally incorporated in the toner particle has an SP value near that of the wax. The wax has a high affinity for the organosilicon polymer, and due to this the wax is attracted to the organosilicon polymer during storage and is thus kept in the toner particle. As a consequence, even in a high-temperature, high-humidity ambient, the wax does not become exposed at the toner particle surface and harmful effects associated with this, e.g., blocking, can be suppressed.

The internal incorporation of the organosilicon polymer in the toner particle is defined, as shown in the FIGURE, as the presence of the organosilicon polymer in the region that is equal to or less than 80% of the distance A from the centroid, in terms of a distance A from the centroid of the toner particle cross section to the contour of the cross section. When equal to or less than 80% is observed, a satisfactorily long distance is then present between the organosilicon polymer and the toner particle surface and due to this the wax, which is restrained by the organosilicon polymer, can be prevented from going out to the toner particle surface.

In order to bring about the presence of the organosilicon polymer in the region that is not more than 80% of the distance A from the centroid, the location of occurrence can be freely controlled through adjustment of the dispersion time, the dispersion intensity, the amount of the organosilicon polymer, and so forth, during preparation of a polymerizable monomer composition by mixing the organosilicon polymer with, e.g., polymerizable monomer, pigment, and so forth.

The reference signs in the FIGURE are as follows:

1: organosilicon polymer, 2: boundary line representing, in terms of a distance A from the centroid of the toner particle cross section to the contour of the cross section, the region that is not more than 80% of the distance A from the centroid, 3: centroid of the toner particle cross section, 4: distance A from the centroid of the toner particle cross section to the contour of the cross section, 5: distance that is 80% of the distance A from the centroid of the toner particle cross section.

An organosilicon polymer is used in the toner. The substructure of the organosilicon polymer can be freely controlled through control of the type and amount of the organosilicon compounds used to form the polymer and the reaction temperature, reaction time, reaction solvent, and pH during the hydrolysis, addition polymerization, and condensation polymerization during formation of the organosilicon polymer.

In particular, when the structure represented by formula (1) is contained in large amounts, a polymer with a three-dimensional structure is formed and the organosilicon polymer assumes a high hydrophobicity. The SP value of the organosilicon polymer assumes a value close to the SP value of the wax as a consequence and a substantial attractive effect for the wax is exhibited.

In addition, the organosilicon polymer has a higher affinity for the binder resin than common inorganic fillers, e.g., silica, and as a consequence even at small amounts of addition it can satisfactorily suppress wax exudation. As a result, there is no loss of low-temperature fixability due to the impairment of fixability caused by the addition of large amounts of filler, and image defects, e.g., the reduction in image density due to member contamination caused by wax exudation to the toner particle surface, can be suppressed.

The organosilicon polymer has the structure given by the following formula (1).

$$R^1—SiO_{3/2} \quad (1)$$

In formula (1), $R^1$ is an alkyl group having from 1 to 4 (preferably from 1 to 3 and more preferably 1 or 2) carbons. $R^1$ is even more preferably the methyl group.

The content of the structure represented by formula (1) in the organosilicon polymer is preferably from 50 mass % to 100 mass %, more preferably from 80 mass % to 100 mass %, still more preferably from 90 mass % to 100 mass %, even more preferably from 95 mass % to 100 mass %, and particularly preferably from 98 mass % to 100 mass %.

The SP value $(cal/cm^3)^{1/2}$ of the organosilicon polymer is preferably from 8.00 to 9.70 and more preferably from 8.50 to 9.00.

The organosilicon polymer is preferably present in a particulate state in the toner particle. The number-average value of the long diameter of the organosilicon polymer particles is preferably approximately from 10 nm to 200 nm.

In order to increase the heat-resistant storability still further, the absolute value of the difference between the SP value of the organosilicon polymer and the SP value of the wax is preferably not greater than 0.40 $(cal/cm^3)^{1/2}$. The lower limit is not particularly limited, but is preferably approximately equal to or greater than 0.00 $(cal/cm^3)^{1/2}$. The attractive effect between the organosilicon polymer and wax is more substantially exhibited by having the SP values of the organosilicon polymer and wax be close to one another.

The toner production method is described in the following.

There are no particular limitations on the toner production method, but the suspension polymerization method and dissolution suspension method are advantageously used.

The suspension polymerization method includes a granulation step of forming, in an aqueous medium, particles of a polymerizable monomer composition including polymerizable monomer capable of forming the binder resin, organosilicon polymer, wax, and optional additives such as colorant, and, after the granulation step, a polymerization step of forming toner particles by polymerizing the polymerizable monomer present in the particles of the polymerizable monomer composition.

The dissolution polymerization method includes a granulation step of dispersing a mixed solution provided by mixing a toner particle composition including a binder resin, organosilicon polymer, wax, and optional additives such as colorant, with an organic solvent capable of dissolving the binder resin, in an aqueous medium to form particles of the mixed solution, and, after the granulation step, a solvent removal step in which toner particles are formed by removing the organic solvent present in the particles of the mixed solution.

Toner production by the suspension polymerization method is described in detail in the following, but this should not be understood as a limitation thereto or thereby.

Preparation of the Polymerizable Monomer Composition

A polymerizable monomer composition is prepared wherein the polymerizable monomer composition includes the organosilicon polymer, wax, optional additives such as colorant, and polymerizable monomer capable of forming the binder resin. The colorant may be preliminarily dispersed in a portion of the polymerizable monomer followed by mixing with, e.g., the remainder of the polymerizable monomer. In addition, the polymerizable monomer composition may be prepared by intermixing all of the components at the same time.

Granulation Step

The polymerizable monomer composition is introduced and dispersed into an aqueous medium containing a surfactant or sparingly water-soluble inorganic fine particles, to form particles of the polymerizable monomer composition in the aqueous medium. A dispersion containing particles of the polymerizable monomer composition is thereby obtained.

Preparation of Aqueous Medium

The composition of the aqueous medium is not particularly limited, and known aqueous media that use mainly water may be used.

The aqueous medium may contain a dispersion stabilizer based on a consideration of enhancing the dispersion stability of the particles of the polymerizable monomer composition. The dispersion stabilizer can be exemplified by the following sparingly water-soluble inorganic fine particles, but there is no limitation to these:

carbonate salts such as barium carbonate, calcium carbonate, and magnesium carbonate;

metal phosphate salts such as aluminum phosphate, magnesium phosphate, calcium phosphate, barium phosphate, and zinc phosphate;

sulfate salts such as barium sulfate and calcium sulfate; and metal hydroxides such as calcium hydroxide, aluminum hydroxide, magnesium hydroxide, and ferric hydroxide.

A single one of these may be used or a combination of two or more may be used.

These function as dispersion stabilizers through their presence in the aqueous medium as fine particles.

Polymerization Step

After the aforementioned granulation step, toner particles are formed through the polymerization of the polymerizable monomer present in the resulting particles of the polymerizable monomer composition.

A polymerization initiator may be added in the polymerization step.

A temperature-adjustable reaction vessel having an ordinary stirring means may be used in the polymerization step.

The polymerization temperature is generally at least 40° C. and is preferably from 50° C. to 90° C. The temperature may be held constant from beginning to end, or the temperature may be raised in the latter half of the polymerization step with the goal of obtaining a desired molecular weight distribution.

The stirring blade used by the stirring means may be any stirring blade that can stir up the particles of the polymerizable monomer composition without stagnation and that can maintain a uniform temperature within the vessel.

The stirring blade or stirring means can be exemplified by common stirring blades such as paddle impellers, pitched blade paddle impellers, retreat curve impellers, propeller impellers, disk turbine impellers, helical ribbon impellers, and anchor impellers.

The following, for example, may be used: "Fullzone" (Kobelco Eco-Solutions Co., Ltd.), "Twinstir" (Kobelco Eco-Solutions Co., Ltd.), "Maxblend" (Sumitomo Heavy Industries Co., Ltd.), "Super Mix" (Satake Chemical Equipment Mfg., Ltd.), and "Hi-F Mixer" (Soken Chemical & Engineering Co., Ltd.).

Distillation Step

After the polymerization step, and in order as necessary to remove volatile impurities such as, e.g., unreacted polymerizable monomer, by-products, and so forth, a portion of the aqueous medium may be distilled off in a distillation step after the completion of polymerization. The distillation step may be carried out at normal pressure or under reduced pressure.

Washing Step, Solid-Liquid Separation Step, and Drying Step

With the objective of removing the dispersion stabilizer attached to the surface of the resulting toner particle, a dispersion stabilizer removal treatment may be performed by adding acid or alkali to the dispersion.

The toner particles are then separated from the liquid phase using a common solid-liquid separation procedure, and the toner particles may be re-washed with water in order to completely eliminate the acid or alkali and dispersion stabilizer component dissolved therein. This washing step may be repeated several times, and, after a thorough washing has been carried out, solid-liquid separation may be performed again to obtain the toner particles. The obtained toner particles may be dried using a known drying means.

Classification Step

While the obtained toner particles will have a satisfactorily sharp particle size distribution, when a sharper granulometry is required, the toner particles outside the desired particle size distribution may also be classified and removed by carrying out a classification using, for example, an air classifier.

External Addition Step

The resulting toner particle may be used as such as toner, or may be used as toner after the external addition of an additive to the toner particle.

An additive (also referred to as an external additive) is used in an external addition step with the objective of imparting various characteristics to the toner.

From the standpoint of the durability when added to the toner particle, the additive preferably has a particle diameter that is not more than one-tenth of the weight-average particle diameter of the toner particle.

The particle diameter of the additive denotes the number-average particle diameter as determined by observation with an electron microscope.

Toner production by the dissolution suspension method is described in the following, but this should not be understood as a limitation thereto or thereby.

Preparation of the Mixed Solution

A mixed solution is prepared by mixing a toner particle composition including a binder resin, organosilicon polymer, wax, and optional additives such as colorant, with an organic solvent capable of dissolving the binder resin.

The method of preparation should bring about dissolution or dispersion under the gradual addition, while stirring, of the binder resin, wax, and so forth to an organic solvent that can dissolve the binder resin. However, when a pigment is used as the colorant, and/or when, for example, a wax or charge control agent that is difficult to dissolve in the organic solvent is added, the particles may be reduced in size prior to addition to the organic solvent.

A known dispersing apparatus, e.g., a bead mill, disk mill, and so forth, may be used for effecting dispersion.

Granulation Step

The obtained mixed solution is dispersed in an aqueous medium to form particles of the mixed solution.

The mixed solution is introduced and dispersed into an aqueous medium that contains a surfactant or sparingly water-soluble inorganic fine particles, to form particles of the mixed solution in the aqueous medium. A dispersion containing particles of the mixed solution is obtained as a result.

When the toner particle composition contains an isocyanate group-bearing modified resin, the binder resin may then be produced by adding an active hydrogen group-containing compound and reacting the active hydrogen group-containing compound in the aqueous medium with the modified resin having a segment reactive with the active hydrogen group-containing compound.

The surfactant can be exemplified by the following:

anionic surfactants such as alkylbenzenesulfonate salts, α-olefinsulfonate salts, and phosphate esters;

cationic surfactants such as amine salt types, e.g., alkylamine salts, amino alcohol/fatty acid derivatives, polyamine/fatty acid derivatives, imidazolines, and so forth, and quaternary ammonium salt types, e.g., alkyltrimethylammonium salts, dialkyldimethylammonium salts, alkyldimethylbenzylammonium salts, pyridinium salts, alkylisoquinolinium salts, and benzethonium chloride;

nonionic surfactants such as fatty acid amide derivatives and polyhydric alcohol derivatives; and amphoteric surfactants such as alanine, dodecyldi(aminoethyl)glycine, di(octylaminoethyl)glycine, and N-alkyl-N,N-dimethylammonium betaine.

The dispersion stabilizer used here may be a dispersion stabilizer as exemplified in the previously described Preparation of Aqueous Medium.

Solvent Removal Step

After the aforementioned granulation step, the organic solvent present in the obtained particles of the mixed solution is removed.

For example, a method may be adopted in which the temperature is gradually raised while stirring the system as a whole and the organic solvent in the particles is completely distillatively removed. Or, the solvent may be distillatively removed by reducing the pressure while stirring the dispersion containing the particles of the mixed solution.

The materials used for the toner will now be described.

The following are specific examples of polymerizable monomer that can form the binder resin.

styrene; styrene derivatives such as α-methylstyrene, β-methylstyrene, o-methylstyrene, m-methyl styrene, p-methyl styrene, 2,4-dimethyl styrene, p-n-butylstyrene, p-tert-butyl styrene, p-n-hexyl styrene, p-n-octylstyrene, p-n-nonylstyrene, p-n-decylstyrene, p-n-dodecylstyrene, p-methoxystyrene, and p-phenylstyrene; acrylic polymerizable monomers such as methyl acrylate, ethyl acrylate, n-propyl acrylate, isopropyl acrylate, n-butyl acrylate, isobutyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers such as methyl methacrylate, ethyl methacrylate, n-propyl methacrylate, isopropyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate.

A single one of these polymerizable monomers may be used by itself or a combination of two or more may be used.

Among the preceding, the use of styrene or a styrene derivative, either individually or as a mixture, or of these mixed with another polymerizable monomer, is preferred from the standpoint of the durability and development characteristics of the toner. In particular, the binder resin preferably contains a styrene-acrylic resin and more preferably is a styrene-acrylic resin. In this case, the compatibility with waxes and particularly ester waxes is high and the low-temperature fixability is improved, and as a consequence the effects of the present invention are exhibited to an even more significant degree.

The styrene-acrylic resin preferably has a styrene-acrylic copolymer segment. For example, the styrene-acrylic resin may be a hybrid resin having a styrene-acrylic copolymer segment and a polyester segment. The content of the styrene-acrylic copolymer segment in the styrene-acrylic resin is preferably from 50 mass % to 100 mass %, more preferably from 80 mass % to 100 mass %, and still more preferably from 90 mass % to 100 mass %.

The styrene-acrylic copolymer segment preferably contains at least one selected from the group consisting of styrene-alkyl acrylate ester copolymers and styrene-alkyl methacrylate ester copolymers. In addition, the number of carbons in the alkyl group in the alkyl acrylate ester and alkyl methacrylate ester is preferably from 2 to 8 (and more preferably from 3 to 8).

Having the number of carbons be at least 2 serves to restrain reductions in the Tg and improve the heat-resistant stability. By having the number of carbons be not more than 8, the Tg is then not excessively high and a good fixing performance is provided.

The toner particle may contain a colorant. The colorant can be exemplified by the known colorants used in toners, e.g., organic pigments, oily dyes, and so forth. Specific examples are provided in the following, but this should not be understood as a limitation thereto.

Pigments used for cyan colorants can be exemplified by copper phthalocyanine compounds and derivatives thereof, anthraquinone compounds, and basic dye lake compounds.

The following are specific examples:

C.I. Pigment Blue 15, C.I. Pigment Blue 15:1, C.I. Pigment Blue 15:2, C.I. Pigment Blue 15:3, and C.I. Pigment Blue 15:4.

Pigments used for magenta colorants can be exemplified by condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

The following are specific examples:

C.I. Pigment Violet 19, C.I. Pigment Red 31, C.I. Pigment Red 122, C.I. Pigment Red 150, and C.I. Pigment Red 269.

Pigments used for yellow colorants can be exemplified by condensed azo compounds, isoindolinone compounds, anthraquinone compounds, azo-metal complexes, methine compounds, and allylamide compounds.

The following are specific examples:

C.I. Pigment Yellow 74, C.I. Pigment Yellow 93, C.I. Pigment Yellow 120, C.I. Pigment Yellow 151, C.I. Pigment Yellow 155, C.I. Pigment Yellow 180, and C.I. Pigment Yellow 185.

Black colorants can be exemplified by carbon black and magnetic bodies and by black colorants provided by color mixing using the aforementioned yellow, magenta, and cyan colorants to give a black color.

The colorant content, considered per 100 mass parts of the binder resin or polymerizable monomer that can form the binder resin, is preferably from 1 mass parts to 20 mass parts.

Known waxes as indicated by the following can be used as the wax:

polymethylene waxes such as paraffin waxes, polyolefin waxes, microcrystalline waxes, and Fischer-Tropsch waxes;

petroleum based-waxes and their derivatives, e.g., amide waxes and petrolatum; natural waxes and their derivatives, e.g., montan wax and derivatives thereof, carnauba wax, and candelilla wax, and hardened castor oil and derivatives thereof; and plant waxes, animal waxes, higher fatty acids, long-chain alcohols, ester waxes, and ketone waxes, and their derivatives such as graft compounds and block compounds.

A single one of these may be used by itself or a combination of two or more may be used.

The wax preferably contains an ester wax and more preferably is an ester wax.

Preferably at least one wax has a melting point (the temperature corresponding to the maximum endothermic peak in the endothermic curve measured in the temperature range from 20° C. to 200° C. using a differential scanning calorimeter) from 30° C. to 120° C. and more preferably from 50° C. to 100° C.

The wax is preferably a solid at room temperature, and a solid wax having a melting point from 50° C. to 100° C. is particularly preferred from the standpoint of the blocking resistance, multisheet durability, low-temperature fixability, and offset resistance of the toner.

The SP value $(cal/cm^3)^{1/2}$ of the wax is preferably from 8.30 to 9.00 and more preferably from 8.50 to 9.00. When the SP value of the wax is at least 8.30, the affinity with the organosilicon polymer is then high, wax exudation is restrained, and the heat-resistant stability is enhanced. Moreover, because this facilitates compatibilization with the binder resin, it is advantageous for enhancing the low-temperature fixability. When the SP value of the wax is equal to or less than 9.00, the hydrophilicity is then not too high and due to this exposure of the wax at the toner particle surface during toner production and storage is impeded. The heat-resistant stability is enhanced as a consequence.

The content in the toner particle of the wax (preferably ester wax) is preferably from 6.00 mass % to 16.00 mass % and more preferably from 6.68 mass % to 15.19 mass %.

When the wax content is at least the aforementioned lower limit, the plasticizing capacity for the resin is high and the effects of the present invention are exhibited to a substantial degree. On the other hand, a good heat-resistant stability is established at equal to or less than the upper limit. In addition, a good offset resistance is also established and the occurrence of toner fusion to the drum and toner fusion to the developing sleeve is impeded.

Ester waxes that are the condensate of an alcohol component and a carboxylic acid component exhibit a high polarity and a high compatibility with the binder resin. As a consequence, plasticization of the toner is facilitated and a large contribution is made to enhancing the low-temperature fixability. In addition, the affinity for the organosilicon polymer is also high and as a consequence the effects of the present invention are exhibited to a substantial degree.

The ester wax particularly preferably contains an ester compound between a diol and an aliphatic monocarboxylic acid. In specific terms, it is preferably an ester compound, as represented by formula (2) below, between a diol having from 2 to 6 carbons and an aliphatic monocarboxylic acid having from 14 to 22 carbons.

(2)

In formula (2), $R^1$ represents a linear alkylene group having from 2 to 6 (preferably from 2 to 3) carbons and $R^2$ and $R^3$ each independently represent a linear alkyl group having from 10 to 21 (preferably from 13 to 18) carbons.

The diol having from 2 to 6 carbons can be exemplified by ethylene glycol, diethylene glycol, 1,3-propanediol, 1,4-butanediol, and 1,6-hexanediol.

The aliphatic monocarboxylic acid having from 14 to 22 carbons can be exemplified by aliphatic monocarboxylic acids such as myristic acid, palmitic acid, stearic acid, and behenic acid.

By having the ester wax take on this structure, a high affinity with the binder resin is established and the effects of the present invention are then exhibited to a substantial degree.

There are no particular limitations on the extraction method when the wax must be extracted from the toner in order to determine the properties described above, and, for example, a method such as the following can be used.

For example, a prescribed amount of toner is subjected to Soxhlet extraction using toluene, the solvent is removed from the obtained toluene-soluble matter, and the chloroform-insoluble matter is then obtained. This is followed by analysis and identification using, for example, an IR method.

The measurements performed for quantitation and the properties may be carried out using a "Q1000" differential scanning calorimeter (TA Instruments).

The glass transition temperature is taken to be the intersection between the differential heat curve and the line for the midpoint between the base lines for before and after the appearance of the change in the specific heat during the measurement. In addition, the peak temperature (melting point) of the maximum endothermic peak for the wax is obtained from the DSC curve obtained during temperature ramp up.

The organosilicon polymer preferably is a condensation polymer of a compound including an organosilicon compound having the structure given by the following formula (Z).

(Z)

In formula (Z), $R_1$ represents an alkyl group having from 1 to 4 carbons.

$R_1$ becomes the $R^1$ in formula (1) via polymerization, and the groups preferred for it are also the same.

$R_2$, $R_3$, and $R_4$ each independently represent a halogen atom, hydroxy group, acetoxy group, or alkoxy group (having preferably from 1 to 4 carbons and more preferably 1 to 3 carbons) (also referred to below as reactive groups).

These reactive groups form a crosslinked structure through hydrolysis, addition polymerization, and condensation polymerization. Preferably $R_2$, $R_3$, and $R_4$ each independently represent the alkoxy group, and the methoxy group or ethoxy group are particularly preferred, due to a mild hydrolyzability at room temperature. The hydrolysis, addition polymerization, and condensation polymerization of $R_2$, $R_3$, and $R_4$ can be controlled through the reaction temperature, reaction time, reaction solvent, and pH.

A single species or a combination of a plurality of species of the organosilicon compound given by formula (Z) (also referred to as a trifunctional silane in the following), having one unreactive group ($R_1$) and three reactive groups ($R_2$, $R_3$, and $R_4$), may be used to obtain the organosilicon polymer.

The following are examples of the compound represented by formula (Z) above: trifunctional methyl silanes such as methyl trimethoxysilane, methyl triethoxysilane, methyl diethoxymethoxysilane, methyl ethoxydimethoxysilane, methyl trichlorosilane, methyl methoxydichlorosilane, methyl ethoxydichlorosilane, methyl dimethoxychlorosilane, methyl methoxyethoxychlorosilane, methyl diethoxychlorosilane, methyl triacetoxysilane, methyl diacetoxymethoxysilane, methyl diacetoxyethoxysilane, methyl acetoxydimethoxysilane, methyl acetoxymethoxyethoxysilane, methyl acetoxydiethoxysilane, methyl trihydroxysilane, methyl methoxydihydroxysilane, methyl ethoxydihydroxysilane, methyl dimethoxyhydroxysilane, methyl ethoxymethoxyhydroxysilane, and methyl diethoxyhydroxysilane; and trifunctional silanes such as ethyl trimethoxysilane, ethyl triethoxysilane, ethyl trichlorosilane, ethyl triacetoxysilane, ethyl trihydroxysilane, propyl trimethoxysilane, propyl triethoxysilane, propyl trichlorosilane, propyl triacetoxysilane, propyl trihydroxysilane, butyl trimethoxysilane, butyl triethoxysilane, butyl trichlorosilane, butyl triacetoxysilane and butyl trihydroxysilane.

An organosilicon polymer obtained by combining any of the following with an organosilicon polymer having the structure represented by formula (Z) may also be used to the extent that this does not detract from the effects of the invention: an organosilicon compound having four reactive groups in the molecule (tetrafunctional silane), an organosilicon compound having three reactive groups in the molecule (trifunctional silane), an organosilicon compound having two reactive groups in the molecule (bifunctional silane) or an organosilicon compound having one functional group (monofunctional silane). Examples include the following:

dimethyldiethoxysilane, tetraethoxysilane, hexamethyldisilazane, 3-aminopropyltrimethoxysilane, 3-aminopropyltriethoxysilane, 3-(2-aminoethyl)aminopropyltrimethoxysilane, and 3-(2-aminoethyl)aminopropyltriethoxysilane;

trifunctional vinylsilanes such as vinyltriisocyanatosilane, vinyltrimethoxysilane, vinyltriethoxysilane, vinyl diethoxymethoxysilane, vinylethoxydimethoxysilane, vinylethoxydihydroxysilane, vinyldimethoxyhydroxysilane, vinylethoxymethoxyhydroxysilane, and vinyldiethoxyhydroxysilane;

hexyltrimethoxysilane, hexyltriethoxysilane, hexyltrichlorosilane, hexyltriacetoxysilane and hexyltrihydroxysilane; and trifunctional phenylsilanes such as phenyltrimethoxysilane, phenyltriethoxysilane, phenyltrichlorosilane, phenyltriacetoxysilane, and phenyltrihydroxysilane.

The content of the organosilicon polymer in the toner particle is preferably from 0.040 mass % to 0.800 mass %. From 0.060 mass % to 0.600 mass % is more preferred.

At 0.040 mass % and above, the attractive effect for the wax due to the addition of the organosilicon polymer acts more strongly and a large effect is obtained with regard to enhancing the heat-resistant storability. At 0.800 mass % and below, the inhibition of heat transfer during fixing due to the organosilicon polymer, and reductions in the plasticization capacity for the binder resin due to an overly strong attractive effect for the wax, are both absent, and there is an enhancing effect on the low-temperature stability. Moreover, the appearance of disturbances in granulation due to the addition of large amounts of the filler particle is impeded and a toner having a sharp particle size distribution can be produced.

In order to control the charge quantity on the toner particle to a desired value, a charge control agent may be blended into (internal addition) or mixed with (external addition) the toner particle.

Known charge control agents can be used as this charge control agent.

The following, for example, are examples of charge control agents that control the toner particle to negative charging:

organometal compounds and chelate compounds are effective; monoazo dye metal compounds; acetylacetone metal compounds; aromatic hydroxycarboxylic acids and aromatic mono- and polycarboxylic acids, and their metal salts, anhydrides, and esters; and phenol derivatives such as bisphenol.

Additional examples are urea derivatives, metal-containing salicylic acid compounds, calixarene, silicon compounds, styrene-acrylic acid copolymers, styrene-methacrylic acid copolymers, sulfonic acid group-containing resins such as styrene-acrylic-sulfonic acid copolymers, and metal-free carboxylic acid compounds.

On the other hand, the following, for example, are examples of charge control agents that control the toner particle to positive charging:

nigrosine and its modifications by fatty acid metal salts; quaternary ammonium salts such as the tributylbenzylammonium salt of 1-hydroxy-4-naphthosulfonic acid and tetrabutylammonium tetrafluoroborate; onium salts such as phosphonium salts, and their lake pigments, triphenylmethane dyes and their lake pigments (the laking agent can be exemplified by phosphotungstic acid, phosphomolybdic acid, phosphotungstomolybdic acid, tannic acid, lauric acid, gallic acid, ferricyanide, and ferrocyanide), and metal salts of higher fatty acids; diorganotin oxides such as dibutyltin oxide, dioctyltin oxide, and dicyclohexyltin oxide; and diorganotin borates such as dibutyltin borate, dioctyltin borate, and dicyclohexyltin borate.

A single charge control agent may be used by itself or two or more may be used in combination.

The content of the charge control agent, considered per 100 mass parts of the binder resin or polymerizable monomer that can form the binder resin, is preferably from 0.01 mass parts to 20 mass parts and more preferably from 0.5 mass parts to 10 mass parts.

A polymerization initiator may be used in the polymerization step. The polymerization initiator can be exemplified by azo-type polymerization initiators and organoperoxide-type initiators.

The azo-type polymerization initiators can be exemplified by the following:

2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobismethylbutyronitrile.

The organoperoxide-type initiators can be exemplified by the following:

benzoyl peroxide, methyl ethyl ketone peroxide, diisopropyl peroxycarbonate, cumene hydroperoxide, 2,4-dichlorobenzoyl peroxide, lauroyl peroxide, and tert-butyl peroxypivalate.

A redox initiator, including the combination of an oxidizing substance with a reducing substance, may also be used. The oxidizing substance can be exemplified by inorganic peroxides such as hydrogen peroxide and persulfate salts (e.g., sodium salt, potassium salt, and ammonium salt) and by oxidizing metal salts such as tetravalent cerium salts.

The reducing substance can be exemplified by reducing metal salts (divalent iron salts, monovalent copper salts, and trivalent chromium salts); ammonia; amino compounds such as lower amines (amines having from 1 to 6 carbons, such as methylamine and ethylamine) and hydroxylamine; reducing sulfur compounds such as sodium thiosulfate, sodium hydrosulfite, sodium bisulfite, sodium sulfite, and sodium formaldehyde sulfoxylate; lower alcohols (from 1 to 6 carbons); ascorbic acid and its salts; and lower aldehydes (from 1 to 6 carbons).

The polymerization initiator is selected considering the 10-hour half-life temperature, and a single one or a combination may be used.

The amount of addition of the polymerization initiator is generally about from 0.5 mass parts to 20 mass parts per 100 mass parts of the polymerizable monomer.

Various crosslinking agents may also be used. The crosslinking agent can be exemplified by the following:

divinylbenzene, 4,4'-divinylbiphenyl, hexanediol diacrylate, ethylene glycol di(meth)acrylate, diethylene glycol di(meth)acrylate, glycidyl (meth)acrylate, and trimethylolpropane tri(meth)acrylate.

There are no particular limitations on the binder resin in the dissolution suspension method, and it may be selected as appropriate from among known binder resins. Also usable are the binder resins yielded by polymerization of the previously described polymerizable monomers.

Specific examples are the homopolymers and copolymers of, for example, styrenes such as styrene and chlorostyrene; monoolefins such as ethylene, propylene, butylene, and isoprene; vinyl esters such as vinyl acetate, vinyl propionate, vinyl benzoate, and vinyl butyrate; a-methylene aliphatic monocarboxylate esters, e.g., methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers such as vinyl methyl ether, vinyl ethyl ether, and vinyl butyl ether; and vinyl ketones such as vinyl methyl ketone, vinyl hexyl ketone, and vinyl isopropenyl ketone.

Polymers of styrene or a substituted form thereof can be exemplified by polystyrene, poly-p-chlorostyrene, and poly-vinyl toluene.

Styrene copolymers can be exemplified by styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl a-chloromethacrylate copolymer, styrene-acrylonitrile copolymer, styrene-vinyl methyl ketone copolymer, styrene-butadiene copolymer, styrene-isoprene copolymer, styrene-acrylonitrile-indene copolymer, styrene-maleic acid copolymer, and styrene-maleate ester copolymer.

The following are examples of typical binder resins: polystyrene resins, polyester resins, styrene-alkyl acrylate copolymers, styrene-alkyl methacrylate copolymers, styrene-acrylonitrile copolymers, styrene-butadiene copolymers, styrene-maleic anhydride copolymers, polyethylene resins, and polypropylene resins. A single one of these may be used by itself or two or more may be used in combination.

As in the case of suspension polymerization, the binder resin is preferably a styrene-acrylic resin. This styrene-acrylic resin is as previously described.

The organic solvent should be capable of dissolving the binder resin, but is not otherwise particularly limited; however, it is preferably volatile, with a boiling point below 100° C., from the standpoint of facilitating the ensuing solvent removal.

The organic solvent can be exemplified as indicated below. A single one of these may be used or a combination of two or more may be used.

Toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, methyl isobutyl ketone, and so forth.

When the resin to be dissolved or dispersed in the organic solvent is a resin having a polyester skeleton, an ester solvent such as methyl acetate, ethyl acetate, butyl acetate, and so forth, or a ketone solvent such as methyl ethyl ketone, methyl isobutyl ketone, and so forth, is preferred from the standpoint of the solubility of this resin.

Methyl acetate, ethyl acetate, and methyl ethyl ketone are more preferred from the standpoint of ease of solvent removal.

A modified resin (also referred to as a "prepolymer" in the following) may be used in the dissolution suspension method. The modified resin should have at least a segment capable of reacting with an active hydrogen group-containing compound, but is not otherwise particularly limited, and a suitable selection can be made from among known resins. Specific examples are polyol resins, polyacrylic resins, polyester resins, and epoxy resins and their derivative resins.

A single one of these may be used by itself or two or more may be used in combination.

Among the preceding, polyester resins are preferred from the standpoints of transparency and a high flowability when melted.

The segment in the prepolymer capable of reacting with an active hydrogen group-containing compound is not particularly limited, and a suitable selection can be made from among known substituents and so forth. Specific examples are the isocyanate group, epoxy group, carboxy group, acid chloride group, and so forth.

A single one of these may be contained by itself or two or more may be contained. The isocyanate group is preferred among the preceding.

The active hydrogen group-containing compound functions as, for example, an extender or crosslinking agent, when the modified resin capable of reacting with the active hydrogen group-containing compound undergoes, for example, an extension reaction or crosslinking reaction in the aqueous medium.

The active hydrogen group-containing compound should have an active hydrogen group, but is not otherwise particularly limited and can be selected as appropriate depending on the objective. For the case in which the polymer capable of reacting with the active hydrogen group-containing compound is an isocyanate group-bearing polyester prepolymer, amines are a preferred specific example of the active hydrogen group-containing compound from the standpoint of being able to raise the molecular weight through reaction, e.g., an extension reaction or crosslinking reaction, with the isocyanate group-bearing polyester prepolymer.

There are no particular limitations on the active hydrogen group and an appropriate selection may be made depending on the objective. Specific examples are the hydroxyl group (alcoholic hydroxyl group or phenolic hydroxyl group), amino group, carboxy group, mercapto group, and so forth. A single one of these may be used by itself or two or more may be used in combination. The alcoholic hydroxyl group is preferred among the preceding.

An external additive may be added to the toner with the goal of improving various powder properties.

The external additive can be exemplified by the following:

metal oxides such as aluminum oxide, titanium oxide, strontium titanate, cerium oxide, magnesium oxide, chromium oxide, tin oxide, and zinc oxide; nitrides such as silicon nitride; carbides such as silicon carbide; inorganic metal salts such as calcium sulfate, barium sulfate, and calcium carbonate; metal salts of fatty acids, such as zinc stearate and calcium stearate; and carbon black and silica.

The content of the external additive, per 100 mass parts of the toner particle, is preferably from 0.01 mass parts to 10 mass parts and is more preferably from 0.05 mass parts to 5 mass parts. A single external additive may be used by itself or combinations of external additives may be used. These external additives are more preferably external additives that have been subjected to a hydrophobing treatment.

The toner particle may be a magnetic toner particle that contains a magnetic body.

The magnetic body incorporated in the toner particle may also function as a colorant. This magnetic body can be exemplified by the following:

iron oxides such as magnetite, hematite, and ferrite; metals such as iron, cobalt, and nickel; alloys of these metals with a metal such as aluminum, cobalt, copper, lead, magnesium, tin, zinc, antimony, beryllium, bismuth, cadmium, calcium, manganese, selenium, titanium, tungsten, and vanadium; and mixtures thereof.

The content of the magnetic body, considered per 100 mass parts of the binder resin or polymerizable monomer that can form the binder resin, is preferably from 20 mass parts to 200 mass parts and more preferably from 40 mass parts to 100 mass parts.

When a magnetic body is used, a hydrophobic treatment is preferably carried out on the surface of the magnetic body in order to improve the dispersibility of the magnetic body in the toner particle.

A coupling agent, e.g., a silane coupling agent, titanium coupling agent, and so forth, may be used for the hydrophobic treatment.

A silane coupling agent is preferred thereamong.

The silane coupling agent can be exemplified by the following:

vinyltrimethoxysilane, vinyltriethoxysilane, gamma1-methacryloxypropyltrimethoxysilane, vinyltriacetoxysilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-hexadecyltrimethoxysilane, and n-octadecyltrimethoxysilane.

The methods for measuring the various properties are described in the following.

Methods for measuring volume-based median diameter (Dv50), number-based median diameter (Dn50) and particle distribution of toner particle The volume-based median diameter (Dv50), number-based median diameter (Dn50) of the toner particle are calculated as follows.

A Multisizer 3 Coulter Counter(R) (Beckman Coulter, Inc) precision particle size analyzer based on the pore electrical resistance method and equipped with a 100 μm aperture tube is used as the measurement apparatus. The dedicated software included with the apparatus (Beckman Coulter Multisizer 3 Version 3.51, Beckman Coulter, Inc) is used for setting the measurement conditions and analyzing the measurement data. Measurement is performed with 25,000 effective measurement channels.

The electrolyte solution used for measurement is a solution of special grade sodium chloride dissolved in deionized water to a concentration of about 1 mass %, such as "ISOTON II" (Beckman Coulter, Inc.).

The following settings are performed on the dedicated software prior to measurement and analysis.

On the "Change standard measurement method (SOMME)" screen of the dedicated software, the total count number in control mode is set to 50,000 particles, the number of measurements to 1, and the Kd value to a value obtained using "Standard 10.0 μm particles" (Beckman Coulter, Inc.). The threshold and noise level are set automatically by pressing the "Threshold/Noise level measurement" button. The current is set to 1600 μA, the gain to 2 and the electrolyte solution to ISOTON II, and a check is entered for "Aperture tube flush after measurement".

On the "Pulse to particle size conversion setting" screen of the dedicated software, the bin interval is set to the logarithmic particle size, the number of particle size bins is set to 256, and the particle size range is set to the range of 2 μm to 60 μm.

The specific measurement methods are as follows.

(1) About 200 mL of the electrolyte solution is placed in a glass 250 mL round-bottomed beaker dedicated to the Multisizer 3, the beaker is set in the sample stand, and the solution is stirred with a stirrer rod counter-clockwise at a rate of 24 rotations per second. Dirt and bubbles in the aperture tube are then removed by the "Aperture tube flush" function of the dedicated software.

(2) About 30 mL of the electrolyte solution is placed in a 100 mL flat-bottomed glass beaker. About 0.3 mL of a diluted solution of "Contaminon N" (a 10 mass % aqueous solution of a neutral detergent for washing precision measuring instruments, containing a nonionic surfactant, an anionic surfactant, and an organic builder and having a pH of 7, Wako Pure Chemical Industries, Ltd.) diluted about 3× by mass with deionized water is added thereto as a dispersant.

(3) An ultrasonic disperser (Ultrasonic Dispersion System Tetra 150, Nikkaki Bios Co., Ltd.) with an electrical output of 120 W equipped with two built-in oscillators (oscillating frequency 50 kHz) with their phases displaced 180° from each other is prepared. About 3.3 liters of deionized water are placed to the water tank of the ultrasonic disperser, and about 2 mL of Contaminon N are added to this tank.

(4) The beaker of (2) above is set in the beaker fixing hole of the ultrasonic disperser, and the ultrasonic disperser is operated. The height position of the beaker is then adjusted so as to maximize the resonance state of the surface of the electrolyte solution in the beaker.

(5) The electrolyte solution in the beaker of (4) above is exposed to ultrasound as about 10 mg of the toner particle is added little by little to the electrolyte solution, and dispersed. Ultrasound dispersion is then continued for a further 60 seconds. During ultrasound dispersion, the water temperature inside the water tank is adjusted appropriately so as to be from 10° C. to 40° C.

(6) Using a pipette, the electrolyte solution of (5) above with the toner particle dispersed therein is dropped into the round-bottomed beaker of (1) above set in the sample stand, to adjust the measurement concentration to about 5%. Measurement is then performed until the number of measured particles is 50,000.

(7) The measurement data are analyzed using the dedicated software included with the apparatus, and the volume-based median diameter (Dv50) and number-based median diameter (Dn50) are calculated.

The particle distribution is indicated by the ratio of Dv50 to Dn50 (Dv50/Dn50), and the closer this ratio is to 1.00, the sharper the particle size distribution.

Method for calculating solubility parameter (SP value)

The SP value is determined using the Fedors formula (4). The evaporation energies and molar volumes (25° C.) of the atoms and atomic groups given in Tables 3-9 of "Basic Coating Science", pages 54 to 57, 1986 (Maki Shoten) can be consulted for the values of Δei and Δvi in the formula.

$$\delta i = [Ev/V]^{1/2} = [\Delta ei/\Delta vi]^{1/2} \quad (4)$$

Ev: Evaporation energy

V: Molar volume

Δei: Evaporation energy of atom or atomic group of component i

Δvi: Molar volume of atom or atomic group of component i

For example, hexanediol is composed of the atomic groups (—OH)—2+(—CH$_2$)×6, and its calculated SP value is determined by the following formula.

$$\delta i = [\Delta ei/\Delta vi]^{1/2} = [\{(5220) \times 2 + (1180) \times 6\}/\{(13) \times 2 + (16.1) \times 6\}]^{1/2}$$

The resulting SP value (δi) is 11.95. The SP value is given in units of (cal/cm$^3$)$^{1/2}$.

Measurement of the SP Values of the Organosilicon Polymer and Wax from the Toner The SP value of the wax can be calculated using the instant method and the results provided by the previously described method for the separation of the wax from the toner and its analysis and identification.

In addition, the SP value of the organosilicon polymer can be calculated using the instant method and the results of identification of the structure of the organosilicon polymer using NMR, infra.

Method for Measuring the Position of Occurrence of the Organosilicon Polymer, as Measured by Observation of the Toner Particle Cross Section using a Scanning Transmission Electron Microscope (STEM)

Cross-sectional observation of the toner particle is performed as follows.

As a specific method of observing the toner particle in cross-section, the toner is first thoroughly dispersed in a room temperature curable epoxy resin, and cured for two days in a 40° C. atmosphere. A flaky sample is cut out from the obtained cured product using a microtome which is provided with a diamond blade. This sample is magnified 10,000 to 100,000 times with a scanning electron transmission microscope (STEM) (JEM 2800, JEOL Ltd.), and a toner particle cross-section is observed.

Using the difference between the atomic weights of the atoms in the organosilicon compound and the resin used in the toner, these are confirmed based on the fact that the contrast is brighter the greater the atomic weight. Furthermore, ruthenium tetroxide staining and osmium tetroxide staining may also be used to provide contrast between materials.

To accurately determine the location of the organosilicon polymer, a bright field image of the toner particle cross-section is obtained with a FEI Co. electron microscope (Tecnai TF20XT) at an acceleration voltage of 200 kV. Next, an EF mapping image of the Si-K edge (99 eV) is obtained by the Three Window method using a Gif Tridiem EELS detector (Gatan, Inc.), and the presence of organosilicon polymer in the region extending up to 80% of the distance A from the centroid out of the total distance A from the centroid of the toner particle cross-section to the contour of the cross-section is confirmed.

To distinguish the organosilicon polymer from silica, an EF mapping image is also obtained for oxygen, and the two are distinguished based on the difference in brightness.

Determination of the Range in Which the Organosilicon Polymer is Present

WinROOF (Mitani Corporation), a commercial image analysis software, is used in each of the measurements described in the following.

Since the organosilicon polymer is thought to be uniformly dispersed in three dimensions in the toner particle, even though the organosilicon polymer is present in the interior of the toner particle, the probability of observation in a cross section randomly sectioned out of the individual particle is low. The range of occurrence of the organosilicon polymer is determined using the following method considering this.

Line segments are drawn from the centroid of the toner particle cross section through the organosilicon polymer to the contour of the toner particle cross section. All of the lengths L on these line segments from the centroid to organosilicon polymer are measured. For the individual organosilicon polymer, the length L is measured at the position closest to the center. X % is defined as the percentage for the length L with reference to the line segment length (distance A). X % is measured for all the organosilicon polymer observed in the cross section of one toner particle.

100 particles are observed and the minimum value of all the measured X %'s is defined as Xmin. When Xmin is equal to or less than 80%, the measurement sample is then scored as being a toner particle for which, in terms of a distance A from the centroid of the toner particle cross section to the contour of the cross section, the organosilicon polymer is present in the region that is not more than 80% of the distance A from the centroid.

Xmin, for example, is preferably about from 1% to 70% and is more preferably about from 10% to 60%.

In addition, the arithmetic average value of X, for example, is preferably about from 10% to 70% and is more preferably about from 20% to 60%.

Method for confirming structure represented by formula (1)

The structure represented by formula (1) in the organosilicon polymer contained in the toner particle is confirmed by the following method.

The presence or absence of the alkyl group represented by $R^1$ in formula (1) is confirmed by $^{13}$C-NMR. The detailed structure of formula (1) is confirmed by $^1$H-NMR, $^{13}$C-NMR and $^{29}$Si-NMR. The apparatus and measurement conditions are shown below.

Measurement Conditions
Apparatus: Bruker Corporation. AVANCE III 500
Probe: 4 mm MAS BB/$^1$H
Measurement temperature: Room temperature
Sample rotation: 6 kHz
Sample: 150 mg of measurement sample (tetrahydrofuran (THF)-insoluble component of toner particle for NMR measurement) is placed in sample tube 4 mm in diameter.

In this method, the presence or absence of the alkyl group represented by $R^1$ in formula (1) is detected. If a signal is detected, the structure of formula (1) is judged to be "present".

Measurement conditions for (solid) $^{13}$C-NMR
Measurement nuclear frequency: 125.77 MHz
Standard substance: Glycine (external standard: 176.03 ppm)
Observation width: 37.88 kHz
Measurement method: CP/MAS
Contact time: 1.75 ms
Repeat time: 4 s
Cumulative number: 2048 times
LB value: 50 Hz
(Solid) $^{29}$Si-NMR measurement method
Measurement conditions
Apparatus: Bruker Corporation. AVANCE III 500
Probe: 4 mm MAS BB/$^1$H
Measurement temperature: Room temperature
Sample rotation: 6 kHz
Sample: 150 mg of measurement sample (THF-insoluble component of toner particle for NMR measurement) is placed in sample tube 4 mm in diameter.
Measurement nuclear frequency: 99.36 MHz
Standard substance: DSS (external standard: 1.534 ppm)
Observation width: 29.76 kHz
Measurement method: DD/MAS, CP/MAS
$^{29}$Si 90° pulse width: 4.00 μs@-1 dB
Contact time: 1.75 ms to 10 ms
Repeat time: 30 s (DD/MAS), 10 s (CP/MAS)
mCumulative number: 2048 times
LB value: 50 Hz Method for Separating External Additive With a toner comprising an external additive added to a toner particle, the external additive is removed before using the toner particle as a sample. The specific methods are as follows.

160 g of sucrose (Kishida Chemical Co., Ltd.) is added to 100 mL of deionized water and dissolved in a hot water bath to prepare a concentrated sucrose stock solution. 31 g of this concentrated sucrose stock solution and 6 mL of Contaminon N are placed in a centrifuge tube to prepare a dispersion solution. 1 g of the toner is added to this dispersion solution, and toner clumps are broken up with a spatula or the like.

The centrifuge tube is shaken for 20 minutes under conditions of 350 reciprocations per minute in a shaker (KM Shaker, IWAKI INDUSTRY CO.,LTD). After being shaken, the solution is transferred to a glass tube (50 mL) for a swing rotor and centrifuged for 30 minutes at 3500 rpm with a centrifuge (H-9R, KOKUSAN Co. Ltd.). After centrifugation the glass tube contains the toner particle in the uppermost layer, while the external additive is present in the aqueous solution of the lower layer, so only the toner particle of the uppermost layer is collected.

When the external additive has not been completely removed, centrifugation is repeated as necessary. Once it has been thoroughly separated, the toner solution is dried and the toner particle is collected.

Analysis of Organosilicon Polymer-Coated Toner

In the case of analysis on a toner particle in which organosilicon polymer is present at the toner particle surface, a portion is sampled prior to coating the toner particle surface with the organosilicon polymer and can be used for analysis after cooling, then dissolution of the dispersion stabilizer by the addition of hydrochloric acid to a pH of 1.4 or below, filtration, washing, and drying.

Method for Measuring the Glass Transition Temperature Tg (° C.)

The glass transition temperature (Tg) is measured using a "Q1000" differential scanning calorimeter (TA Instruments).

The melting points of indium and zinc are used for temperature correction in the instrument detection section, and the heat of fusion of indium is used for correction of the amount of heat.

Specifically, an approximately 10 mg sample is exactly weighed out and introduced into an aluminum pan; an empty aluminum pan is used for reference.

The measurement is carried out at a ramp rate of 10° C./min in the measurement range of 30° C. to 200° C.

The change in the specific heat in the temperature range of 40° C. to 100° C. is obtained in this heating process.

The glass transition temperature Tg (° C.) of the sample is taken to be the point at the intersection between the differential heat curve and the line for the midpoint for the baselines for prior to and subsequent to the appearance of the change in the specific heat.

Measurement of the Content of the Organosilicon Polymer in the Toner Particle

The amount of the organosilicon polymer in the toner particle can be measured by measuring the amount of silicon by fluorescence X-ray.

Measurement of each element by fluorescence X-ray is performed in accordance with JIS K 0119-1969, specifically as follows.

For the measurement equipment, an "Axios" wavelength dispersive X-ray fluorescence spectrometer (Malvern Panalytical Ltd.) is used together with the accessory dedicated "SuperQ ver. 4.0 F" software (Malvern Panalytical Ltd) for setting the measurement conditions and analyzing the measurement data. Rh is used for the anode of the X-ray tube and vacuum as the measurement atmosphere, with a measurement diameter (collimator diameter) of 10 mm and a measurement time of 10 seconds.

Detection is performed using a proportional counter (PC) for measuring light elements and a scintillation counter (SC) for measuring heavy elements.

For the measurement sample, about 1 g of the toner particle is placed in a 10 mm dedicated aluminum ring for pressing, spread flat, and pressed for 60 seconds at 20 MPa with a BRE-32 tablet press (Maekawa Testing Machine MFG Co., LTD) to mold a pellet about 2 mm thick.

Measurement is performed under the above conditions, the elements are identified based on their peak positions in the resulting X-ray, and their concentrations are calculated from the count rate (unit: cps), which is the number of X-ray photons per unit time.

To assay the amount of silicon in the toner particle for example, a silica ($SiO_2$) fine powder for example is added to 0.5 mass parts per 100 mass parts of the toner particle, and thoroughly mixed with a coffee mill. Similarly, silica fine powder is also added to 2.0 mass parts and 5.0 mass parts and mixed with the toner particle, and these are used as samples for a calibration curve.

Pellets of the calibration curve samples are prepared from each sample with a tablet press as described above, and the total count rate (unit: cps) of Si-Kα rays observed at a diffraction angle (2θ) of 109.08° using PET as the dispersive crystal is measured. The acceleration voltage and current value of the X-ray generator in this case are set to 24 kV and 100 mA, respectively. The resulting X-ray count rate is plotted on the vertical axis and the amount of $SiO_2$ added to each calibration curve sample on the horizontal axis to obtain a calibration curve of linear function.

Next, the toner particle for analysis is made into a pellet with a tablet press as described above, and the count rate of Si-Kα rays is measured. The content of the organosilicon polymer in the toner is then determined from the calibration curve.

Method for Measuring the Content, Glass Transition Temperature (Tg), and Melting Point of the Wax The content, glass transition temperature (Tg), and melting point of the wax are measured using a "Q1000" differential scanning calorimeter (TA Instruments) in accordance with ASTM D 3418-82.

The melting points of indium and zinc are used for temperature correction in the instrument detection section, and the heat of fusion of indium is used for correction of the amount of heat.

Specifically, a 1 mg sample is exactly weighed out and introduced into an aluminum pan; an empty aluminum pan is used for reference.

First, using the toner as the sample, heating is carried out from 0° C. to 150° C. at a ramp rate of 10° C./minute, and the endothermic quantity for the endothermic peak originating with the wax and measured in this sequence is defined as H1 (J/g).

After holding for 15 minutes at 150° C., cooling is carried out from 150° C. to 0° C. at a ramp down rate of 10° C./minute. After holding for 10 minutes at 0° C., heating is carried out a second time from 0° C. to 150° C. at a ramp rate of 10° C./minute, and the endothermic quantity for the endothermic peak originating with the wax and measured in this sequence is defined as H2 (J/g).

The endothermic quantity is calculated from the area, in the temperature region where an endothermic peak is observed, bounded by the differential scanning calorimetric curve presenting the endothermic peak obtained during heating and the baseline for the differential scanning calorimetric curve.

This same measurement is run with the wax by itself, and the peak temperature of the endothermic peak in the second heating sequence is taken to be the melting point (° C.) of the wax and the endothermic quantity is defined as Hw (J/g).

The wax content (mass %) is then determined using the following formula.

wax content (mass %)=100×H1/Hw

For the glass transition temperature (Tg) of the toner or resin, a modulation measurement is carried out using the aforementioned measurement instrument and a 1 mg sample, in the measurement range from 20° C. to 140° C. and using settings of a ramp rate of 1° C./minute and an oscillation temperature width of ±0.318° C./minute. The change in the specific heat in the temperature range from 20° C. to 140° C. is obtained in this heating process.

The glass transition temperature is taken to be the temperature (° C.) at the point where the curve segment for the stepwise change at the glass transition intersects with the straight line that is equidistant, in the direction of the vertical axis, from the straight lines that extend each of the base lines for before and after the appearance of the change in the specific heat in the obtained curve for the change in the specific heat.

EXAMPLES

The present invention is described in greater detail in the following using examples and comparative examples, but the present invention is not limited to or by these. Unless specifically indicated otherwise, the "parts" and "%" described in the following formulations are on a mass basis in all instances.

Production of Organosilicon Polymer 1
Preparation of Apatite Dispersion 916.4 parts of deionized water, 14.83 parts of sodium phosphate, and 6.4 parts of hydrochloric acid were introduced into a vessel, followed by heating to 60° C. to prepare an aqueous sodium phosphate solution. On the other hand, an aqueous calcium chloride solution was prepared by dissolving 8.60 g of calcium chloride in 60.2 parts of deionized water. The aqueous sodium phosphate solution was stirred at a rotation rate of 12000 rpm using a CLEAR-MIX (M Technique Co., Ltd.); the aqueous calcium chloride solution was added; and an apatite dispersion was obtained by holding for 30 minutes.

Preparation of an Organosilicon Compound Hydrolysis Solution 100 parts of methyltrimethoxysilane and 112 parts of deionized water adjusted to a pH of 4 with hydrochloric acid were introduced into a vessel; mixing was carried out using a paddle impeller; and an organosilicon compound hydrolysis solution was obtained by stirring until phase separation was not observed by visual inspection.

Polymerization-Solid/Liquid Separation-Drying Step 400 parts of the apatite dispersion was introduced into a vessel; heating to 55° C. was carried out on a water bath; and stirring was performed at 200 rpm using a paddle impeller. This was followed by the addition of 22.1 parts of the organosilicon compound hydrolysis solution to the apatite dispersion. After 10 minutes, 9.7 parts of a 7.94 mass % aqueous sodium carbonate solution was added over 15 minutes using a gear pump and polymerization was carried out for 3 hours.

Then, after cooling the dispersion, 30 parts of 10 mass % hydrochloric acid was added while stirring, and a dispersion containing organosilicon polymer 1 was obtained by stirring for 2.5 hours. Organosilicon polymer 1 was filtered from the dispersion, followed by washing with water and then drying for 48 hours at a temperature of 40° C. to obtain an organosilicon polymer 1.

Production of Organosilicon Polymer 2

An organosilicon polymer 2 was obtained using the same method as for organosilicon polymer 1, but changing the organosilicon compound from the 100 parts of methyltrimethoxysilane to a combination of 97 parts of methyltrimethoxysilane and 3 parts of phenyltrimethoxysilane.

Production of Organosilicon Polymer 3

An organosilicon polymer 3 was obtained using the same method as for organosilicon polymer 1, but changing the organosilicon compound from the 100 parts of methyltrimethoxysilane to a combination of 94 parts of methyltrimethoxysilane and 6 parts of phenyltrimethoxysilane.

Production of Organosilicon Polymer 4

An organosilicon polymer 4 was obtained using the same method as for organosilicon polymer 1, but changing the organosilicon compound from the 100 parts of methyltrimethoxysilane to a combination of 92 parts of methyltrimethoxysilane and 8 parts of phenyltrimethoxysilane.

Toner Particle 1 Production Example

| | |
|---|---|
| styrene | 72.0 parts |
| n-butyl acrylate | 28.0 parts |
| 1,6-hexanediol diacrylate | 0.6 parts |
| copper phthalocyanine pigment (Pigment Blue 15:3) | 6.2 parts |
| aluminum salicylate compound (Bontron E88, Orient Chemical Industries Co., Ltd.) | 0.8 parts |
| polar resin (saturated polyester resin provided by the condensation polymerization reaction of terephthalic acid and isophthalic acid with the 2 mol adduct of propylene oxide on bisphenol A, weight-average molecular weight = 13000, acid value = 8 mg KOH/g, glass transition temperature = 74° C.) | 4.0 parts |
| wax (ethylene glycol distearate, melting point = 76° C.) | 10 parts |
| organosilicon polymer 1 | 0.10 parts |

The preceding materials were mixed; 15-mm ceramic beads were introduced into the resulting mixture; and dispersion was performed for 2 hours using a wet attritor (Nippon Coke & Engineering Co., Ltd.) to obtain a polymerizable monomer composition.

Otherwise, 6.3 parts of sodium phosphate ($Na_3PO_4$) was introduced into 414.0 parts of deionized water and heating to 60° C. was carried out while stirring using a CLEARMIX (M Technique Co., Ltd.). This was followed by the addition of an aqueous calcium chloride solution of 3.6 parts of calcium chloride ($CaCl_2$) dissolved in 25.5 parts of deionized water, and stirring was continued to prepare an aqueous medium containing a dispersion stabilizer composed tricalcium phosphate ($Ca_3(PO_4)_2$).

9.0 parts of the polymerization initiator t-butyl peroxypivalate was added to the polymerizable monomer composition; this was introduced into the aqueous medium described above; and a granulation step was run for 10 minutes while maintaining 15000 rpm with the CLEARMIX.

Polymerization was then run for 5 hours while holding at 70° C. and stirring in a stirred tank equipped with a common stirrer, followed by heating to 85° C., holding for 1 hour, then heating to 100° C., and holding for 2 hours.

Cooling was then carried out to obtain toner particle dispersion 1.

Hydrochloric acid was added to toner particle dispersion 1 to bring the pH to 1.4 or below and dissolve the dispersion stabilizer; filtration, washing, and drying then yielded a toner particle 1.

Toner Particles 2 to 6, 8 to 24, and 26 to 28 Production Example

Toner particles 2 to 6, 8 to 24, and 26 to 28 were obtained proceeding as in the Toner Particle 1 Production Example, but changing the materials used as indicated in Tables 1-1 and 1-2.

Silica fine particles having a number-average primary particle diameter of 40 nm were used as the $SiO_2$ for toner 27.

Toner Particle 7 Production Example

The following materials were introduced under a nitrogen atmosphere into a reactor fitted with a reflux condenser, stirrer, and nitrogen introduction line.

| | |
|---|---|
| toluene | 110 parts |
| polyester resin | 110 parts |
| (solution of a saturated polyester resin obtained by a condensation polymerization reaction between terephthalic acid and the 2 mol adduct of ethylene oxide on bisphenol A, resin Tg = 54.5° C.) | |

While stirring the interior of the reactor at 200 rotations per minute, heating at 70° C. and stirring were carried out for 10 hours to obtain a binder resin solution 7.

The following components:

| | |
|---|---|
| binder resin solution 7 | 201.2 parts |
| polar resin | 4.0 parts |
| (solution of a saturated polyester resin obtained by a condensation polymerization reaction of terephthalic acid, isophthalic acid, and the 2 mol adduct of propylene oxide on bisphenol A, resin Tg = 74° C.) | |
| wax (ethylene glycol distearate, melting point = 76° C.) | 10 parts |
| organosilicon polymer 1 | 0.10 parts |
| copper phthalocyanine pigment (Pigment Blue 15:3) | 6.2 parts |
| aluminum salicylate compound | 0.8 parts |
| (Bontron E88, Orient Chemical Industries Co., Ltd.) | |

Using a wet attritor (Nippon Coke & Engineering Co., Ltd.) filled with ceramic beads having a diameter of 15 mm, these components were mixed and dispersed for 10 hours to obtain a resin composition solution 7.

Otherwise, 6.3 parts of sodium phosphate ($Na_3PO_4$) was introduced into 414.0 parts of deionized water and heating to 60° C. was carried out while stirring using a CLEARMIX (M Technique Co., Ltd.).

This was followed by the addition of an aqueous calcium chloride solution of 3.6 parts of calcium chloride ($CaCl_2$) dissolved in 25.5 parts of deionized water; stirring was continued to prepare an aqueous medium containing a dispersion stabilizer composed of tricalcium phosphate ($Ca_3(PO_4)_2$).

The resin composition solution 7 was introduced into the aforementioned aqueous medium and a granulation step was run for 10 minutes while maintaining 15000 rpm with the CLEARMIX to obtain a resin composition dispersion 7.

The toluene in the resin composition dispersion 7 was removed by raising the temperature of the resin composition dispersion 7 to 95° C. and stirring for 120 minutes.

Cooling was then carried out to obtain toner particle dispersion 7.

Hydrochloric acid was added to toner particle dispersion 7 to bring the pH to 1.4 or below and dissolve the dispersion stabilizer; filtration, washing, and drying then yielded a toner particle 7.

Toner Particle 25 Production Example

Toner particle 25 was obtained proceeding as in the Toner Particle 1 Production Example, but changing the materials used as indicated in Table 1-1 and proceeding from the reaction step as follows.

Aqueous Medium A Preparation Step 35.0 parts of deionized water was metered into a vessel equipped with a stirrer and thermometer and the pH was adjusted to 5.0 using 10 mass % hydrochloric acid. Heating was carried out while stirring to bring the temperature to 30° C.

3.0 parts of methyltrimethoxysilane was then added and stirring was carried out for 1 hour to obtain aqueous medium A.

Reaction Step/Step of Preparation of an Organosilicon Polymer-Coated Toner Particle The dispersion of the polymerizable monomer composition was transferred to a separate tank and stirring was carried out with a paddle impeller while holding at 55° C. 20.4 parts of the aqueous medium A was added to the dispersion of the polymerizable monomer composition and holding was carried out for 30 minutes while stirring. The slurry was then adjusted to pH 9.0 using an aqueous sodium hydroxide solution, and holding for an additional 300 minutes yielded a dispersion of organosilicon polymer-coated toner particles.

Cooling was then carried out to obtain toner particle dispersion 25.

Hydrochloric acid was added to toner particle dispersion 25 to bring the pH to 1.4 or below and dissolve the dispersion stabilizer; filtration, washing, and drying then yielded a toner particle 25.

Examples 1 to 25 and Comparative Examples 1 to 3

Toners 1 to 25 (the toners in Examples 1 to 25) were obtained by adding, to 100.0 parts of each of the obtained toner particles, 1.0 parts of silica fine particles having a number-average primary particle diameter of 40 nm and mixing using an FM mixer (Nippon Coke & Engineering Co., Ltd.).

Toners 26 to 28 (the toners in Comparative Examples 1 to 3) were obtained by similarly intermixing silica fine particles. The properties of the obtained toners are given in Tables 1-1 and 1-2.

TABLE 1-1

| Toner | | | | | | Wax | | | |
|---|---|---|---|---|---|---|---|---|---|
| Example No. | particle No. | Styrene (parts) | Acrylic monomer Type | Parts | Tg ° C. | Type | SP value | Parts | Content mass % |
| 1 | 1 | 72 | n-butyl acrylate | 28 | 54.5 | Ethylene glycol distearate | 8.85 | 10 | 8.22 |
| 2 | 2 | 74 | n-butyl methacrylate | 26 | 54.7 | Ethylene glycol distearate | 8.85 | 10 | 8.22 |
| 3 | 3 | 70 | Ethyl acrylate | 30 | 54.3 | Ethylene glycol distearate | 8.85 | 10 | 8.22 |
| 4 | 4 | 68 | Methyl acrylate | 32 | 54.3 | Ethylene glycol distearate | 8.85 | 10 | 8.22 |
| 5 | 5 | 78 | n-octyl acrylate | 22 | 54.5 | Ethylene glycol distearate | 8.85 | 10 | 8.22 |
| 6 | 6 | 82 | n-dodecyl acrylate | 18 | 54.5 | Ethylene glycol distearate | 8.85 | 10 | 8.22 |
| 7 | 7 | — | — | — | 54.6 | Ethylene glycol distearate | 8.85 | 10 | 8.22 |
| 8 | 8 | 72 | n-butyl acrylate | 28 | 54.7 | Ethylene glycol distearate | 8.85 | 10 | 8.22 |
| 9 | 9 | 72 | n-butyl acrylate | 28 | 54.4 | Ethylene glycol distearate | 8.85 | 10 | 8.22 |
| 10 | 10 | 72 | n-butyl acrylate | 28 | 54.5 | Ethylene glycol distearate | 8.85 | 10 | 8.22 |
| 11 | 11 | 72 | n-butyl acrylate | 28 | 54.4 | Ethylene glycol distearate | 8.85 | 10 | 8.22 |
| 12 | 12 | 72 | n-butyl acrylate | 28 | 54.5 | Ethylene glycol distearate | 8.85 | 8 | 6.68 |
| 13 | 13 | 72 | n-butyl acrylate | 28 | 54.5 | Ethylene glycol distearate | 8.85 | 3 | 2.51 |

TABLE 1-1-continued

| | Toner | | Acrylic monomer | | | Wax | | | |
|---|---|---|---|---|---|---|---|---|---|
| Example No. | particle No. | Styrene (parts) | Type | Parts | Tg °C. | Type | SP value | Parts | Content mass % |
| 14 | 14 | 72 | n-butyl acrylate | 28 | 54.5 | Ethylene glycol distearate | 8.85 | 20 | 15.19 |
| 15 | 15 | 72 | n-butyl acrylate | 28 | 54.6 | Ethylene glycol distearate | 8.85 | 25 | 18.99 |
| 16 | 16 | 72 | n-butyl acrylate | 28 | 54.4 | Distearyl sebacate | 8.81 | 10 | 8.22 |
| 17 | 17 | 72 | n-butyl acrylate | 28 | 54.6 | Paraffin wax | 8.39 | 10 | 8.22 |
| 18 | 18 | 72 | n-butyl acrylate | 28 | 54.4 | Dipentaerythritol hexastearate | 8.97 | 10 | 8.22 |
| 19 | 19 | 72 | n-butyl acrylate | 28 | 54.4 | Dipentaerythritol hexapalmitate | 9.01 | 10 | 8.22 |
| 20 | 20 | 72 | n-butyl acrylate | 28 | 54.4 | Behenyl behenate | 8.59 | 10 | 8.22 |
| 21 | 21 | 72 | n-butyl acrylate | 28 | 54.5 | Paraffin wax | 8.28 | 10 | 8.22 |
| 22 | 22 | 72 | n-butyl acrylate | 28 | 54.6 | Ethylene glycol distearate | 8.85 | 10 | 8.22 |
| 23 | 23 | 72 | n-butyl acrylate | 28 | 54.4 | Ethylene glycol distearate | 8.85 | 10 | 8.22 |
| 24 | 24 | 72 | n-butyl acrylate | 28 | 54.5 | Ethylene glycol distearate | 8.85 | 10 | 8.22 |
| 25 | 25 | 72 | n-butyl acrylate | 28 | 54.5 | Ethylene glycol distearate | 8.85 | 20 | 15.19 |
| C. 1 | 26 | 72 | n-butyl acrylate | 28 | 54.5 | Ethylene glycol distearate | 8.85 | 10 | 8.22 |
| C. 2 | 27 | 72 | n-butyl acrylate | 28 | 54.4 | Ethylene glycol distearate | 8.85 | 10 | 8.22 |
| C. 3 | 28 | 72 | n-butyl acrylate | 28 | 54.5 | Ethylene glycol distearate | 8.85 | 10 | 8.22 |

TABLE 1-2

| | Toner | Organosilicon polymer/SiO$_2$ | | | | | | Particle | | |
|---|---|---|---|---|---|---|---|---|---|---|
| Example No. | particle No. | No. | SP value | Parts | Content mass % | Xmin % | (A) | SP value difference | diameter (μm) | Particle size distribution |
| 1 | 1 | 1 | 8.94 | 0.10 | 0.082 | 32 | Present | 0.09 | 6.5 | 1.25 |
| 2 | 2 | 1 | 8.94 | 0.10 | 0.082 | 33 | Present | 0.09 | 6.4 | 1.26 |
| 3 | 3 | 1 | 8.94 | 0.10 | 0.082 | 33 | Present | 0.09 | 6.5 | 1.24 |
| 4 | 4 | 1 | 8.94 | 0.10 | 0.082 | 29 | Present | 0.09 | 6.4 | 1.24 |
| 5 | 5 | 1 | 8.94 | 0.10 | 0.082 | 34 | Present | 0.09 | 6.5 | 1.25 |
| 6 | 6 | 1 | 8.94 | 0.10 | 0.082 | 33 | Present | 0.09 | 6.5 | 1.24 |
| 7 | 7 | 1 | 8.94 | 0.10 | 0.082 | 35 | Present | 0.09 | 6.5 | 1.26 |
| 8 | 8 | 1 | 8.94 | 0.049 | 0.040 | 68 | Present | 0.09 | 6.2 | 1.23 |
| 9 | 9 | 1 | 8.94 | 0.024 | 0.020 | 75 | Present | 0.09 | 6.1 | 1.22 |
| 10 | 10 | 1 | 8.94 | 0.973 | 0.80 | 10 | Present | 0.09 | 7.1 | 1.32 |
| 11 | 11 | 1 | 8.94 | 1.22 | 1.0 | 5.0 | Present | 0.09 | 7.2 | 1.34 |
| 12 | 12 | 1 | 8.94 | 0.10 | 0.082 | 30 | Present | 0.09 | 6.4 | 1.25 |
| 13 | 13 | 1 | 8.94 | 0.10 | 0.082 | 29 | Present | 0.09 | 6.3 | 1.26 |
| 14 | 14 | 1 | 8.94 | 0.10 | 0.082 | 28 | Present | 0.09 | 6.4 | 1.25 |
| 15 | 15 | 1 | 8.94 | 0.10 | 0.082 | 30 | Present | 0.09 | 6.6 | 1.25 |
| 16 | 16 | 1 | 8.94 | 0.10 | 0.082 | 30 | Present | 0.13 | 6.4 | 1.25 |
| 17 | 17 | 1 | 8.94 | 0.10 | 0.082 | 33 | Present | 0.55 | 6.5 | 1.24 |
| 18 | 18 | 1 | 8.94 | 0.10 | 0.082 | 32 | Present | 0.03 | 6.4 | 1.25 |
| 19 | 19 | 1 | 8.94 | 0.10 | 0.082 | 29 | Present | 0.07 | 6.5 | 1.25 |
| 20 | 20 | 1 | 8.94 | 0.10 | 0.082 | 31 | Present | 0.35 | 6.6 | 1.26 |
| 21 | 21 | 1 | 8.94 | 0.10 | 0.082 | 32 | Present | 0.66 | 6.3 | 1.24 |
| 22 | 22 | 2 | 9.25 | 0.10 | 0.082 | 33 | Present | 0.40 | 6.6 | 1.26 |
| 23 | 23 | 3 | 9.55 | 0.10 | 0.082 | 30 | Present | 0.70 | 6.5 | 1.25 |
| 24 | 24 | 1 | 8.94 | 0.012 | 0.010 | 80 | Present | 0.09 | 6.1 | 1.21 |
| 25 | 25 | 1 | 8.94 | 0.10 | 0.082 | 31 | Present | 0.09 | 6.4 | 1.25 |
| C. 1 | 26 | 4 | 9.75 | 0.10 | 0.082 | 32 | Present | 0.90 | 6.4 | 1.25 |
| C. 2 | 27 | SiO$_2$ | 17.8 | 0.10 | 0.082 | 30 | Present | 8.95 | 6.5 | 1.24 |
| C. 3 | 28 | 1 | 8.94 | 0.006 | 0.005 | 90 | Absent | 0.09 | 6.1 | 1.20 |

In the Tables, "C." denotes "Comparative", and "parts" is the number of parts per 100 parts of the binder resin. The content (mass %) is the content in the toner particle. Tg is the Tg of the binder resin. The SiO$_2$ in the No. column for the organosilicon polymer indicates that SiO$_2$ was added. The SP value difference is the difference between the SP value of the wax and the SP value of the organosilicon polymer. The particle diameter is the median diameter on a volume basis. (A) refers to the presence/absence, in terms of a distance A from the centroid of the toner particle cross section to the contour of the cross section, of the organosilicon polymer in the region that is not more than 80% of the distance A from the centroid.

The resulting individual toners were evaluated using the following methods. The results are given in Table 2.

Evaluation of the Developing Performance

Image Density After Standing in a High-Temperature, High-Humidity Environment; Evaluation 1 in the Table 200 g of the toner was held for 30 days in an environment having a temperature of 40° C. and a humidity of 95% RH, and this was used as the toner for evaluation.

An LBP-7700C (Canon, Inc.) was used as the image-forming apparatus; the toner was removed from the cyan cartridge and the toner to be evaluated was filled in its place.

Image evaluation was carried out in a normal-temperature, normal-humidity environment (temperature of 23° C., humidity of 50% RH). The image density was measured using the tinting strength of the toner as the index.

A solid image was output on A4 color laser copy paper (Canon, Inc., 80 g/m$^2$) with the toner laid-on level adjusted to 0.3 mg/cm$^2$.

The evaluation was performed by measuring the density of the solid image (average value of 5 points: upper right, lower right, center, upper left, lower left). For the image density, the relative density versus a white background region with an image density of 0.00 was measured using a "504 Spectrodensitometer" (X-Rite, Incorporated). A score of C or better was regarded as good.

Evaluation Criteria

A: the density difference is at least 1.45
B: the density difference is at least 1.35, but less than 1.45
C: the density difference is at least 1.20, but less than 1.35
D: the density difference is at least 1.05, but less than 1.20
E: the density difference is less than 1.05

Low-Temperature Fixability; Evaluation 2 in the Table

A color laser printer (HP Color LaserJet 3525dn, Hewlett-Packard) with a detached fixing unit was prepared; the toner was removed from the cyan cartridge and the toner to be evaluated was filled in its place.

Using the filled toner, a length 2.0 cm×width 15.0 cm unfixed toner image (toner laid-on level: 0.9 mg/cm$^2$) was then formed on the image-receiving paper (HP Laser Jet 90, Hewlett-Packard, 90 g/m$^2$) at a region 1.0 cm from the upper edge with respect to the paper transport direction. The detached fixing unit was modified to enable the fixation temperature and process speed to be adjusted, and this was used to carry out a fixing test on the unfixed image.

First, with the process speed set to 250 mm/s and operating in a normal-temperature, normal-humidity environment (23° C., 60% RH), the unfixed image was fixed at each temperature, starting from an initial temperature of 110° C. and increasing the set temperature sequentially in 5° C. increments.

The criteria for evaluating the low-temperature fixability are given below. The low temperature-side fixing onset point is the lower temperature limit at which cold offset behavior (behavior whereby a portion of the toner ends up attached to the fixing unit) is not observed. A score of C or better was regarded as good.

A: the low temperature-side fixing onset point is equal to or less than 140° C.
B: the low temperature-side fixing onset point is at least 145° C. and not more than 155° C.
C: the low temperature-side fixing onset point is at least 160° C. and not more than 170° C.
D: the low temperature-side fixing onset point is at least 175° C. and not more than 185° C.
E: the low temperature-side fixing onset point is equal to or greater than 190° C.

Evaluation of the Heat Resistance

Evaluation of the Blocking Resistance; Evaluation 3 in the Table

The blocking resistance of the toner was evaluated using the following method.

Approximately 10 g of toner was introduced into a 100-mL polypropylene cup; standing was carried out for 7 days in an atmosphere with a temperature of 45° C. and a humidity of 95% RH; and a visual evaluation was performed. A score of C or better was regarded as good.

Evaluation Criteria

A: Aggregates are not observed.
B: Aggregates are observed to a slight degree, but are easily broken up.
C: Aggregates are observed, but are easily broken up.
D: Aggregates are observed, but are broken up by shaking.
E: Aggregates can be gripped and are not easily broken up.

Evaluation of Toner Wettability; Evaluation 4 in the Table

The hydrophobicity of the toner particle surface is raised when the wax bleeds out, and due to this the hydrophobicity of the toner was measured using a methanol wettability test.

The methanol wettability was measured on the toner held for 7 days in an atmosphere with a temperature of 45° C. and a humidity of 95% RH in the aforementioned evaluation of the blocking resistance, and on the toner that had not been subjected to the holding process. The ratio of the change in the hydrophobicity was determined using the formula given below.

A larger ratio for the change in the hydrophobicity indicates a greater occurrence of wax bleed out in the high-temperature, high-humidity environment.

Ratio of the change in the hydrophobicity=(hydrophobicity of the toner after holding)/(hydrophobicity of the toner not subjected to holding)

The hydrophobicity of the toner was determined from the amount of methanol addition-transmittance curve acquired using the following method.

First, 60 mL of water was introduced into a cylindrical glass container having a diameter of 5 cm and a thickness of 1.75 mm, and dispersion was carried out for 5 minutes using an ultrasound disperser in order to remove, e.g., the bubbles in the water.

The toner was then vibrated on a mesh having an aperture of 150 μm, and 0.1 g of the toner that passed through the mesh was exactly weighed and added to the container holding the water to prepare a sample liquid for measurement.

The sample liquid for measurement was placed in a "WET-100P" powder wettability tester (Rhesca Co., Ltd.) and was stirred at a rate of 5.0 s$^{-1}$ (300 rpm) using a magnetic stirrer.

A fluororesin-coated spindle-shaped stir bar with a length of 25 mm and a maximum girth diameter of 8 mm was used as the stir bar for the magnetic stirrer.

Methanol was then continuously added through the instrument at a dropwise addition rate of 0.8 mL/min into this sample liquid for measurement, during which time the transmittance was measured using light at a wavelength of 780 nm in order to construct the amount of methanol addition-transmittance curve.

The hydrophobicity was taken to be the methanol concentration when the transmittance, taken from the obtained amount of methanol addition-transmittance curve, reached 50%.

TABLE 2

|  | Evaluation 1 | | Evaluation 2 | | Evaluation 3 | Evaluation 4 |
|---|---|---|---|---|---|---|
|  | Image density | rank | Low temperature-side fixing onset point temperature (° C.) | rank |  | Ratio of the change in wettability |
| Example 1 | 1.51 | A | 135 | A | A | 1.21 |
| Example 2 | 1.50 | A | 135 | A | A | 1.21 |
| Example 3 | 1.49 | A | 135 | A | B | 1.25 |
| Example 4 | 1.47 | A | 135 | A | C | 1.27 |
| Example 5 | 1.51 | A | 140 | A | A | 1.21 |
| Example 6 | 1.50 | A | 145 | B | A | 1.22 |
| Example 7 | 1.51 | A | 150 | B | A | 1.21 |
| Example 8 | 1.46 | A | 135 | A | B | 1.30 |
| Example 9 | 1.45 | A | 135 | A | C | 1.32 |
| Example 10 | 1.51 | A | 150 | B | A | 1.21 |
| Example 11 | 1.50 | A | 160 | C | A | 1.22 |
| Example 12 | 1.49 | A | 155 | B | A | 1.23 |
| Example 13 | 1.50 | A | 160 | C | A | 1.22 |
| Example 14 | 1.42 | B | 135 | A | B | 1.37 |
| Example 15 | 1.40 | B | 135 | A | C | 1.39 |
| Example 16 | 1.50 | A | 165 | C | A | 1.22 |
| Example 17 | 1.42 | B | 165 | C | B | 1.37 |
| Example 18 | 1.37 | B | 135 | A | B | 1.43 |
| Example 19 | 1.35 | B | 135 | A | C | 1.44 |
| Example 20 | 1.35 | B | 135 | A | B | 1.44 |
| Example 21 | 1.33 | C | 170 | C | B | 1.45 |
| Example 22 | 1.30 | C | 135 | A | C | 1.46 |
| Example 23 | 1.25 | C | 135 | A | C | 1.49 |
| Example 24 | 1.26 | C | 135 | A | C | 1.47 |
| Example 25 | 1.46 | B | 140 | A | A | 1.30 |
| C. E. 1 | 1.03 | E | 135 | A | E | 1.73 |
| C. E. 2 | 1.03 | E | 135 | A | E | 1.68 |
| C. E. 3 | 1.04 | E | 135 | A | E | 1.67 |

In the Table, "C. E." denotes "Comparative Example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-156503, filed Aug. 29, 2019, which is hereby incorporated by reference herein in its entirety.

What is claimed is:

1. A toner, comprising:
a toner particle, said toner particle comprising a binder resin, a wax, and an organosilicon polymer which is present in a particulate state in the toner particle, the organosilicon polymer having a structure represented by formula (1)

$$R^1-SiO_{3/2} \qquad (1)$$

where $R^1$ is an alkyl group having 1 to 4 carbons, wherein the organosilicon polymer is contained in a tetrahydrofuran-insoluble component of the toner particle,
in $^{13}$C-NMR measurement of the tetrahydrofuran-insoluble component of the toner particle, the presence of the alkyl group represented by $R^1$ is detected in the tetrahydrofuran-insoluble component,
in a cross section of the toner particle observed using a transmission electron microscope, in terms of a distance A from the centroid of the cross section of the toner particle to a contour of the cross section, the organosilicon polymer is present in a region that is not more than 80% of the distance A from the centroid, and
an absolute value of a difference between a solubility parameter (SP) value of the organosilicon polymer and an SP value of the wax is not more than 0.70 $(cal/cm^3)^{1/2}$.

2. The toner according to claim 1, wherein the SP value of the wax is 8.30 to 9.00 $(cal/cm^3)^{1/2}$.

3. The toner according to claim 1, wherein the wax comprises an ester wax.

4. The toner according to claim 3, wherein the ester wax is represented by formula (2)

where $R^1$ represents a linear alkylene group having 2 to 6 carbons, and $R^2$ and $R^3$ independently represent a linear alkyl group having 10 to 21 carbons.

5. The toner according to claim 1, wherein a content of the wax in the toner particle is 6.00 to 16.00 mass %.

6. The toner according to claim 1, wherein a content of the organosilicon polymer in the toner particle is 0.040 to 0.800 mass %.

7. The toner according to claim 1, wherein the binder resin comprises a styrene-acrylic resin.

8. The toner according to claim 1, wherein the binder resin comprises a styrene-acrylic resin having a styrene-acrylic copolymer segment comprising at least one member selected from the group consisting of styrene-alkyl acrylate ester copolymers and styrene-alkyl methacrylate ester copolymers, and
a number of carbons in an alkyl group in the alkyl acrylate ester and the alkyl methacrylate ester is 2 to 8.

9. The toner according to claim 1, wherein the SP value of the organosilicon polymer is 8.00 to 9.70 $(\text{cal/cm}^3)^{1/2}$.

* * * * *